July 11, 1967  C. A. HANSSON  3,330,529
FLUID CONDUIT COUPLING
Filed Feb. 24, 1964
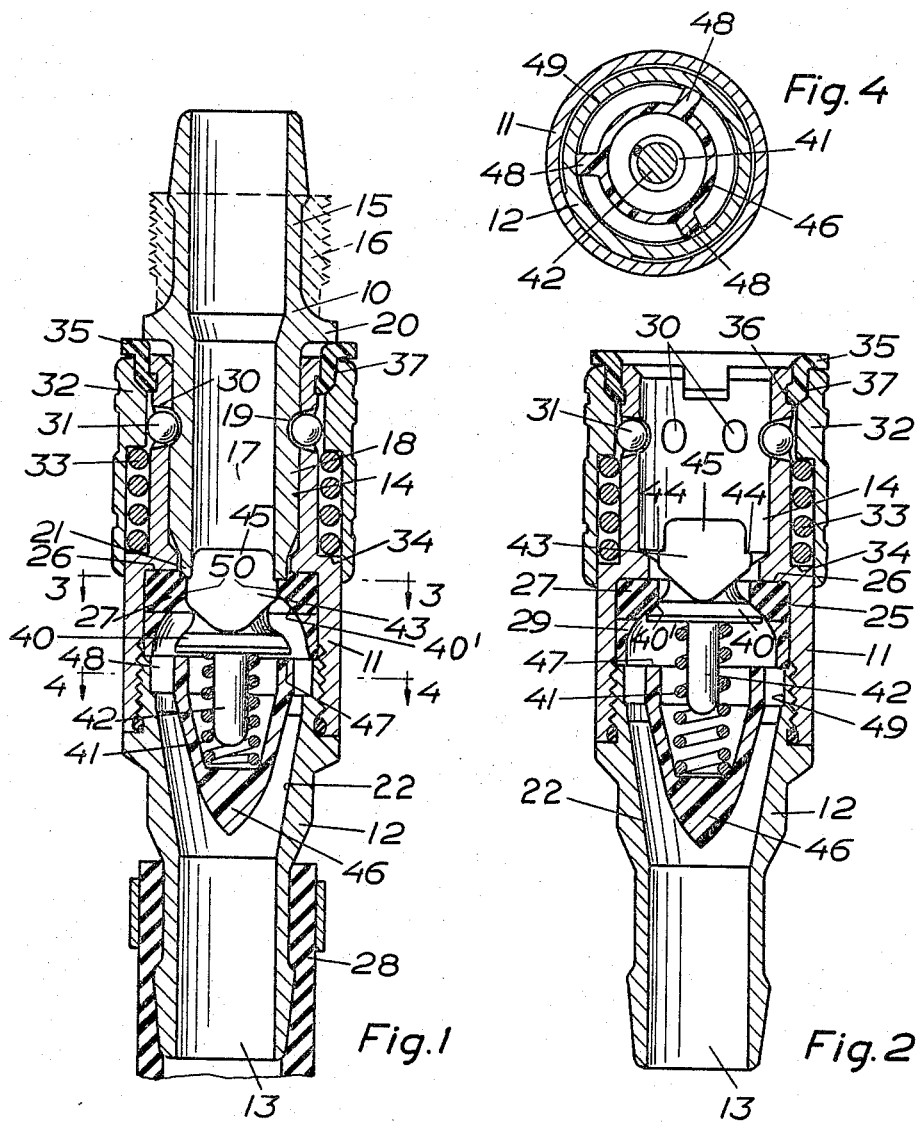
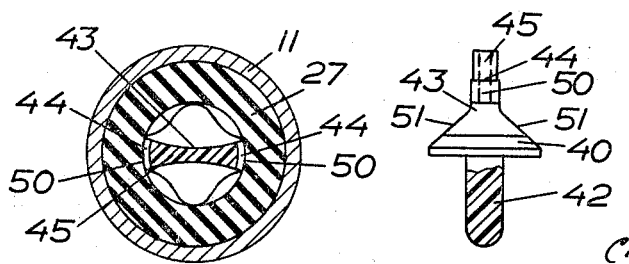
INVENTOR.
CARL ANDERS HANSSON
BY
ATTORNEY

United States Patent Office 3,330,529
Patented July 11, 1967

3,330,529
FLUID CONDUIT COUPLING
Carl Anders Hansson, Johanneshov, Sweden, assignor to Atlas Copco Aktiebolag, Nacka, Sweden, a corporation of Sweden
Filed Feb. 24, 1964, Ser. No. 346,790
8 Claims. (Cl. 251—149.6)

This invention relates to fluid conduit coupling devices of the type adapted to be quickly connected or disconnected and embodying a housing with an internal axially movable shut off valve therein to be opened by inserting a nipple into the housing whereby fluid flowing past the valve is supplied to the nipple. The invention is applicable for connecting sections of hose or pipe or a tool and a hose or pipe, or for making any connection of two conduits for conducting a working fluid such as compressed air, liquid or the like. One object of the invention is to provide a coupling of the above type in which the valve, while kept open by engagement with the nipple, is positively prevented from excessive oscillations and clattering due to pulsating fluid flow. Therefore rapid wear and deformation of the valve and the nipple are prevented. Another object of the invention is to provide a coupling in which the fluid passes through the coupling along a streamlined substantially unobstructed path which makes as few and small bends as possible. A further object of the invention is to provide a coupling which may be manufactured in a simple manner without too close tolerances and by the use of automated machine tools.

In the accompanying drawing one embodiment of a fluid conduit coupling device according to the invention is illustrated by way of example, it being understood, however, that the details of the coupling may be varied within the scope of the claims without departing from the invention. FIG. 1 is a longitudinal sectional view of a coupling device according to the invention with the nipple inserted in the coupling housing and keeping the internal valve open. FIG. 2 is a longitudinal sectional view of the housing with the nipple removed and the valve in closed position. FIG. 3 is a sectional view substantially on line 3—3 in FIG. 1. FIG. 4 is a sectional view on line 4—4 in FIG. 1. FIG. 5, finally, is a partly sectional side view of the valve in FIGS. 1 and 2 turned 90° about its longitudinal axis.

The fluid conduit coupling device illustrated in the drawing consists of a nipple 10 and a composite housing 11, 12 having a passageway 13, 14 axially therethrough and adapted to receive the nipple 10 therein. The nipple 10 is provided with a neck 15 formed for introduction into a hose or may be provided with screw threads as indicated by broken lines at 16 for the connection of the nipple to a tool. The nipple 10 is tubular and is provided with a central passage 17 for the working fluid such as compressed air. A cylindrical nipple portion 18 is provided with an external circumferential groove 19 and is adapted for insertion into the portion 14 of the passageway 13, 14. The nipple 10 has a collar 20 intermediate the neck 15 and the cylindrical portion 18, the latter being terminated by a reduced cylindrical nose 21.

The housing 11, 12 consists of a neck portion 12 and a socket portion 11. The socket portion 11 has a counterbore 25 therein coaxial with the passageway 13, 14, which counterbore is terminated by an inner shoulder 26 against which is retained an annular washer 27 preferably of oil resistant rubber.

The neck portion 12 is formed for introduction into a hose 28 or may as an alternative be provided with threads similar to the threads 16 on the nipple 10 and intended for connection of the neck portion 12 to an air reservoir or the like. A widened end on the neck portion 12 is threaded into the counterbore 25 and keeps a spacing ring 29, which is slidably received in the counterbore 25, firmly pressed against the washer 27 for retaining the latter in place. At the widened end the passageway 13 forms a conically converging portion 22, preferably with a taper of 8–10°.

The socket portion 11 is provided with a number of radial openings 30 around the passageway 14, in which openings balls 31 are movable. A locking sleeve 32 is axially displaceable on the outside of the socket portion 18 against the action of a helical spring 33 bearing against an outer shoulder 34 on the socket portion 11. A split elastic retaining ring 35, preferably made of plastic material such as the acetal plastic sold by Du Pont de Nemours & Co. under the trade name Delrin, is seated by snap action in a circumferential groove 36 at the outer end of the socket portion 11 and forms an axial abutment for the sleeve 32 as well as for the collar 20 on the nipple 10. The cylindrical portion 18 of the nipple 10 is received in the socket portion 11 with a sliding fit in the passageway 14 and is insertable therein to a depth defined by the collar 20 abutting against the ring 35. The balls 31 and the locking sleeve 32 form together a locking device of well known type in which the balls 31 engage the circumferential groove 19 in the nipple 10 and are blocked in this position by the locking sleeve 32 so that the nipple 10 and the housing 11, 12 cannot be moved apart. When the locking sleeve 32 is displaced towards the shoulder 34 on the socket portion 11, the blocking action of the sleeve 32 with respect to the balls 31 is interrupted since the balls are free to move in the openings 30 into an annular widened portion 37 in the locking sleeve 32 so that the nipple 10 may freely be removed from the passageway 14. The inner cross section of the openings 30 is so small that it prevents the balls 31 from falling out into the passageway 14 when the nipple 10 is removed.

A disk-shaped valve 40 with a conical or spherical circumferential seating surface is provided in the housing 11, 12 and is urged by a helical spring 41 towards a conical or spherical annular seat $40^1$ provided by the washer 27. The valve 40 has a flat rear face and a short stem 42 thereon around which the helical spring 41 is centered. On the front end of the valve 40 a flattened lip 43 projects through the washer 27 into the passageway 14. The lip 43 has diametrically opposed shoulders 44 thereon intended for axial engagement with the edge of the nose 21 on the nipple 10 and during such engagement the nose 21 slidingly straddles a projection 45 on the lip 43. The valve is formed out of a light material which may be a light metal or a suitable plastic, for example a polyamide plastic, but it is preferred to make it out of the above mentioned acetal plastic Delrin. The helical spring 41 is nested in and supported by a cup shaped member 46 fixedly disposed in the conical portion 22 of the passageway 13 and coaxially therewith. The flattened rim 47 of the cup shaped member 46, the contour of which rim is substantially equal to or slightly greater than the circumferential contour of the valve 40, is disposed in a plane parallel with but spaced from the washer 27 and adjacent the rim 47 there are provided a number of radial elements or wings 48 on the member 46 which are received with a tight fit in a bore 49 in the neck portion 12. The member 46 is preferably also of Delrin and the wings thereon are firmly retained in the bore 49 by the spacing ring 29 and form the sole means for fixedly keeping the member 46 centered in the conical portion 22 of passageway 13. The valve seat $40^1$, the ring 29, the bore 49, and conical portion 22 define a bulb shaped streamlined valve cavity coaxial with and forming part of the passageway 13, 14 in which valve 40 and member 46 are received.

When the nipple 10 is inserted in the passageway 14 which is possible after displacement of the locking sleeve 32 against the action of the spring 33, the nose 21 of the nipple 10 firstly straddles the projection 45 on the valve 40, engages the shoulders 44 and thereupon forces the valve 40 off its seat 40¹ so that a free communication for the working fluid is obtained through the passageway 13 and the annular washer 27 past the valve 40 and on through the passage 17 in the nipple 10. The groove 19 is positioned on the nipple 10 in a manner to axially lock the nipple when its collar 20 abuts against the retaining ring 35 and when so positioned the nose 21 of the nipple 10 sealingly engages the end of the washer opposed to the seat 40¹, thereby insuring a seal between the nipple and the housing 11, 12. The projection 45 on the lip 43 has a small clearance only in the passage 17 and therefore the valve 40 in its open position, FIG. 1, is kept substantially coaxial with passageway 13 within the contour of the rim 47. In the positioned depicted in FIGS. 1 and 3, the lip 43 is furthermore centered by the opposed partly cylindrical edges 50 of its middle portion which slidingly engage with the central aperture of washer 27. With the valve 40 opened by nipple 10 there is only a small clearance between the rear end of the valve and the rim 47 and therefore excessive oscillations of the valve due to pulsating fluid flow will be minimized. The member 46 and the cavity of the passageway 13 therearound are formed in a streamlined manner to provide a substantially unimpeded fluid flow and since the rim 47 has an outer diameter substantially equal to or slightly greater than the diameter of the valve 40, the flow will not be disturbed by the valve proper. Preferably member 46 has a pointed bottom and is defined by an evenly curved surface of revolution. The valve 40 is also provided with a tapered intermediate portion 51 improving flow towards and past the lip 43. As readily seen the flat surface of rim 47 and the centering portions 47, 50 of the valve 40 positively prevent excessive axial as well as radial movements of the valve 40 in the open position thereof. The light and tough plastic material is apt to reduce inertial forces caused by movement of the valve 40.

The embodiment of the invention above described should only be considered as an example and the details of the invention may be modified in various ways within the scope of the following claims.

What I claim is:

1. A fluid conduit coupling device comprising in combination a housing, an axial socket at one end of said housing for the insertion therein of a coupling nipple, a partially bulb-shaped bore in said housing coaxial with said socket, annular sealing means disposed adjacent said bore for sealing said housing when a coupling nipple is inserted, an annular holder disposed adjacent said bore and threaded to said housing for the axial fixation of said sealing means therein, the radially inner side of said holder having a conical surface to form with said sealing means and said bore a bulb-shaped cavity, a streamlined cup-shaped member fixedly disposed on said holder and coaxially disposed in said bore, a valve in said bore axially at the opposite side of said annular sealing means from said socket, a spring in said bore in engagement with said valve for urging it to seat against said sealing means for closing flow communication through said housing when the coupling nipple is removed therefrom, a lip on said valve engageable with a nipple during the insertion thereof in said socket for moving said valve away from said sealing means to open communication through said housing, said spring being nested in said cup and the rim portion of said cup being of substantially equal contour with said valve and spaced from but parallel with said sealing means for providing a rear abutment for said valve when said lip thereon is engaged by a nipple inserted in said socket, and the surfaces of said cup-shaped member and said valve when in open position and adjacent thereto being spaced from the surfaces of said bulb-shaped cavity to define a curved uninterrupted flowpath axially through said device.

2. A fluid conduit coupling device as set forth in claim 1 in which said cup-shaped member is affixed to said holder by radial elements disposed solely at the end adjacent said radial inner surface and adjacent the wide end of the conical portion thereof.

3. A fluid conduit coupling device as set forth in claim 1 in which said valve is made of plastic material.

4. A fluid conduit coupling device as set forth in claim 1 in which there are provided centering means on said lip projecting into and engaging a nipple inserted into said socket for positively keeping said valve coaxial with said passageway.

5. A fluid conduit coupling device as set forth in claim 1 in which said cup shaped member is a solid of revolution having a pointed end opposite to said rim.

6. A fluid conduit coupling device comprising in combination a housing having a passageway axially therethrough, an annular ring seal in and coaxial with said passageway and forming the curved base of a partly bulb-shaped cavity in said housing and the valve seat therefor, said cavity having a conically converging portion adjacent to said base, a streamlined cup-shaped spring holder disposed in said cavity coaxially with and in said conically converging portion thereof and streamlined for providing a curved substantially unimpeded flow therearound between the surfaces thereof and the spaced surfaces of said bulb-shaped cavity, said holder extending towards said seal and being terminated adjacent thereto by an annular surface spaced from and parallel with said seal, support means for said holder disposed at the widest portion of said cavity and adjacent said ring seal, a valve axially movably disposed in said cavity between an open position adjacent said annular surface within the contour thereof and a closed position with said valve seated on said annular ring seal centrally within said curved base, a spring nested in said holder for engaging said valve for urging it into closed position, a nipple adapted for insertion into said passageway and in sealing engagement with said ring seal in said housing ensuring a seal between said nipple and said housing when the nipple is so inserted, cooperating abutment means on said nipple and said valve adapted for moving said valve into open position when the nipple is so inserted, and a separate screw connection in said housing adjacent the widest portion of said cavity for obtaining entry therein for the simple insertion and withdrawal therefrom of said ring seal and the said cup-shaped spring holder and the support means therefor.

7. A fluid conduit coupling device as set forth in claim 6 in which said holder is affixed to said housing by radial elements disposed solely at the end of said holder adjacent said annular surface and in the widest portion of said cavity thereby leaving the conically converging portion of said cavity free from obstructions.

8. A fluid conduit coupling device as set forth in claim 6 in which said member is a solid of revolution having a pointed end opposite to said annular surface.

References Cited

UNITED STATES PATENTS

| 2,327,611 | 8/1943 | Scheiwer | 251—149.6 |
| 2,729,471 | 1/1956 | Fraser | 137—614.03 |
| 2,744,770 | 5/1956 | Davidson | 251—149.6 |
| 2,855,223 | 10/1958 | Macgregor | 137—614.03 |
| 2,957,504 | 10/1960 | Botkin | 137—614.03 |

M. CARY NELSON, *Primary Examiner.*

W. CLINE, *Assistant Examiner.*